United States Patent
Takahashi et al.

(10) Patent No.: US 9,790,353 B2
(45) Date of Patent: Oct. 17, 2017

(54) RUBBER COMPOSITION AND PNEUMATIC TIRE

(71) Applicant: THE YOKOHAMA RUBBER CO., LTD., Minato-Ku, Tokyo (JP)

(72) Inventors: Ryota Takahashi, Hiratsuka (JP); Manabu Kato, Hiratsuka (JP); Takahiro Okamatsu, Hiratsuka (JP); Yoshiaki Kirino, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 15/114,548

(22) PCT Filed: Dec. 22, 2014

(86) PCT No.: PCT/JP2014/083981
§ 371 (c)(1),
(2) Date: Jul. 27, 2016

(87) PCT Pub. No.: WO2015/114998
PCT Pub. Date: Aug. 6, 2015

(65) Prior Publication Data
US 2016/0340502 A1    Nov. 24, 2016

(30) Foreign Application Priority Data

Jan. 31, 2014  (JP) ................. 2014-016821

(51) Int. Cl.
*C08L 15/00* (2006.01)
*B60C 1/00* (2006.01)
(Continued)

(52) U.S. Cl.
CPC ............. *C08L 15/00* (2013.01); *B60C 1/00* (2013.01); *B60C 1/0016* (2013.01); *C08C 19/22* (2013.01);
(Continued)

(58) Field of Classification Search
CPC .... C08L 15/00; C08L 9/00; C08L 9/06; C08L 45/00; C08L 2205/03; B60C 1/00; B60C 1/0016; C08K 3/00; C08C 19/22
(Continued)

(56) References Cited

U.S. PATENT DOCUMENTS 3,792,031 A * 2/1974 Udding ................. C08C 19/22
525/333.1
7,125,934 B1   10/2006 Parker
(Continued)

FOREIGN PATENT DOCUMENTS

DE     2230351 A1    12/1972
JP     47-025712 B1  7/1972
(Continued)

OTHER PUBLICATIONS

Office Action dated Feb. 13, 2017 issued in the corresponding German Patent Application 11 2014 006 305.3 with a partial English translation thereof.

*Primary Examiner* — Ling Choi
*Assistant Examiner* — Ronald Grinsted
(74) *Attorney, Agent, or Firm* — Carrier Blackman & Associates, P.C.; Joseph P. Carrier; Anne G. Sabourin

(57) ABSTRACT

An object of the present invention is to provide a rubber composition capable of producing a pneumatic tire with both excellent low rolling resistance and wet grip performance, and a pneumatic tire comprising the rubber composition. The rubber composition comprises: a diene-based rubber containing 10 mass % or greater of a modified diene polymer; and an aromatic modified terpene resin; wherein the modified diene polymer is a modified polymer obtained by modifying an unmodified diene polymer (A) with a nitrone compound (B) having a carboxy group; and a content of the aromatic modified terpene resin is from 0.1 to
(Continued)

50 parts by mass per 100 parts by mass of the diene-based rubber.

7 Claims, 1 Drawing Sheet

(51) Int. Cl.
  *C08C 19/22* (2006.01)
  *C08K 3/00* (2006.01)
  *C08L 9/00* (2006.01)
  *C08L 9/06* (2006.01)
  *C08L 45/00* (2006.01)

(52) U.S. Cl.
  CPC ...... *C08K 3/00* (2013.01); *C08L 9/00* (2013.01); *C08L 9/06* (2013.01); *C08L 45/00* (2013.01); *C08L 2205/03* (2013.01); *Y02T 10/862* (2013.01)

(58) Field of Classification Search
  USPC .......................................... 523/156
  See application file for complete search history.

(56) References Cited

U.S. PATENT DOCUMENTS

| 2006/0084730 | A1  | 4/2006 | Fukushima et al. |
| 2007/0004869 | A1* | 1/2007 | Parker .......... B60C 1/0016 525/331.9 |
| 2011/0226395 | A1* | 9/2011 | Goto ............ B60C 1/0016 152/209.1 |

FOREIGN PATENT DOCUMENTS

| JP | 48-016996 A   | 3/1973 |
| JP | 2008-517071 A | 5/2008 |
| JP | 2008-208163 A | 9/2008 |
| JP | 2013-032471 A | 2/2013 |

* cited by examiner

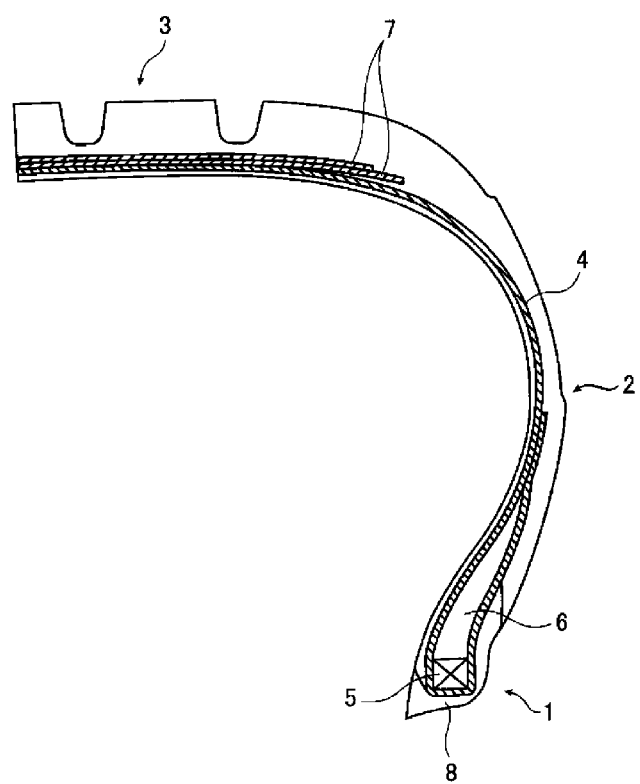

RUBBER COMPOSITION AND PNEUMATIC TIRE

TECHNICAL FIELD

The present invention relates to a rubber composition and a pneumatic tire.

BACKGROUND ART

Modified polymers that are modified by a compound containing a nitrone group (nitrone compound) have been known conventionally as polymers contained in rubber compositions for use in tires and the like.

Patent Document 1, for example, describes "a rubber composition comprising, per 100 parts by weight of a diene-based rubber containing from 5 to 100 wt. % of a modified butadiene rubber, from 10 to 120 parts by weight of silica; wherein the modified butadiene rubber is butadiene rubber with a cis-content of 90% or greater modified by a nitrone compound having a nitrogen-containing heterocycle per molecule (Claim 1)." Additionally, Patent Document 1 describes modification by a nitrone compound causing heat build-up to decrease (paragraph [0006] and the like). Note that lower values of tan δ (60° C.), which is the loss tangent (loss coefficient), are indicative of low heat build-up and low rolling resistance.

CITATION LIST

Patent Literature

Patent Document 1: Japanese Unexamined Patent Application Publication No. 2013-32471A

SUMMARY OF INVENTION

Technical Problem

To-date, improved fuel economy performance of vehicles while traveling has been sort due to environmental concerns. Stemming from this, demands exist for further reduced low rolling resistance via modification, as well as from the perspective of safety for wet grip performance of a high level.

Upon studying "the rubber composition comprising a modified butadiene rubber modified by a nitrone compound having a nitrogen-containing heterocycle per molecule" described in Patent Document 1, the present inventors discovered that when certain nitrone compounds were used as the modifier, both low rolling resistance and wet grip performance were difficult to obtain at a high level.

Therefore, an object of the present invention is to provide a rubber composition capable of producing a pneumatic tire with both excellent low rolling resistance and wet grip performance, and a pneumatic tire comprising the rubber composition.

Solution to Problem

As a result of diligent research, the present inventors discovered that a pneumatic tire with both excellent low rolling resistance and wet grip performance can be produced using a rubber composition comprising a specific amount of modified diene polymer modified using a nitrone compound having a carboxy group and an aromatic modified terpene resin and thus completed the present invention.

Specifically, the present inventors discovered that the problems described above can be solved by the following features.

(1) A rubber composition comprising:
a diene-based rubber containing 10 mass % or greater of a modified diene polymer; and
an aromatic modified terpene resin; wherein
the modified diene polymer is a modified polymer obtained by modifying an unmodified diene polymer (A) with a nitrone compound (B) having a carboxy group; and
a content of the aromatic modified terpene resin is from 0.1 to 50 parts by mass per 100 parts by mass of the diene-based rubber.

(2) The rubber composition according to (1), wherein the nitrone compound (B) is represented by Formula (b) below:

[Chemical Formula 1]

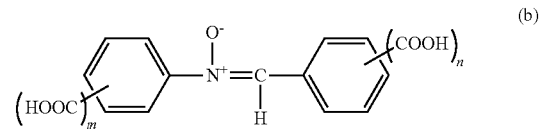

wherein, m and n each independently represent an integer from 0 to 5, and a sum of m and n is 1 or greater.

(3) The rubber composition according to (1) or (2), wherein
the nitrone compound (B) is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

(4) The rubber composition according to any one of (1) to (3), wherein a modification ratio of the modified diene polymer is from 0.01 to 2.0 mol %.

(5) The rubber composition according to any one of (1) to (4) further comprising a white filler.

(6) A pneumatic tire comprising the rubber composition described in any one of (1) to (5).

Advantageous Effects of Invention

As described below, the present invention is able to provide a rubber composition capable of producing a pneumatic tire with both excellent low rolling resistance and wet grip performance, and a pneumatic tire comprising the rubber composition.

BRIEF DESCRIPTION OF DRAWINGS

FIG. 1 is a partial cross-sectional schematic view of a tire that represents one embodiment of a pneumatic tire of the present invention.

DESCRIPTION OF EMBODIMENTS

Hereinafter, a rubber composition and a pneumatic tire comprising the rubber composition of the present invention will be described.

Note that in the present specification, numerical ranges indicated using "from . . . to . . . " include the former number as the lower limit value and the later number as the upper limit value.

Rubber Composition

The rubber composition of the present invention is a rubber composition comprising:

a diene-based rubber containing 10 mass % or greater of a modified diene polymer; and an aromatic modified terpene resin; wherein the modified diene polymer is a modified polymer obtained by modifying an unmodified diene polymer (A) with a nitrone compound (B) having a carboxy group; and a content of the aromatic modified terpene resin is from 0.1 to 50 parts by mass per 100 parts by mass of the diene-based rubber.

The rubber composition of the present invention contains the modified diene polymer and the aromatic modified terpene resin at such specific amounts allowing a pneumatic tire made using the rubber composition to be capable to both excellent low rolling resistance and wet grip performance. Although the reason is not clear, it is assumed to be as follows.

First, when modified diene polymer modified by a nitrone compound having a carboxy group is used to prepare a compound, the incorporation of white filler (especially silica) and other fillers (especially carbon black) is improved. As a result, such fillers are well dispersed, thus achieving good low rolling resistance and wet grip performance.

Such a reason is also suggested by the results of Comparative Example 8 described below in which when a modified styrene-butadiene copolymer rubber (SBR) modified by a nitrone compound having a pyridine ring less polar than a carboxy group is used, low rolling resistance is degraded.

Hereinafter, the diene-based rubber, the modified diene polymer, the preparation method thereof, the aromatic modified terpene resin, the white filler, and other additives will be described.

Diene-Based Rubber

There are no particular restrictions to the diene-based rubber contained in the rubber composition of the present invention as long as it contains at least 10 mass % of the modified diene polymer described below and has double bonds in its main chain, and specific examples thereof include natural rubber (NR), isoprene rubber (IR), butadiene rubber (BR), aromatic vinyl-conjugated diene copolymer rubber, acrylonitrile-butadiene copolymer rubber (NBR), butyl rubber (IIR), halogenated butyl rubber (Br-IIR, Cl-IIR), and chloroprene rubber (CR). One of these diene-based rubbers can be used alone, or a combination of two or more of these diene-based rubbers can be used.

In the present invention, the amount of the modified diene polymer described below contained in the diene-based rubber is preferably from 10 to 100 mass %, and more preferably from 30 to 100 mass %. Note that a content of "100 mass %" refers to the case in which the diene-based rubber contains only the modified diene polymer.

In cases in which the modified diene polymer and the diene-based rubber are present, such a diene-based rubber is preferably natural rubber (NR), and or aromatic vinyl-conjugated diene copolymer (especially styrene-butadiene copolymer rubber (SBR)).

Modified Diene Polymer

The modified diene polymer contained in the rubber composition of the present invention is a modified polymer obtained by modifying an unmodified diene polymer (A) with a nitrone compound (B) having a carboxy group.

Unmodified Diene Polymer (A)

The unmodified diene polymer (A) described above is a polymer containing a carbon-carbon unsaturated bond.

Here, "carbon-carbon unsaturated bond" includes carbon-carbon double bonds (C=C) and/or carbon-carbon triple bonds (C≡C).

In addition, "unmodified" refers to a state that is not modified with the nitrone compound (B) described below, and the word "unmodified" does not exclude polymers that have been modified with other components (especially terminal-unmodified modified polymers).

Examples of such an unmodified diene polymer (A) include vulcanizable diene-based rubber components. Specific examples thereof include natural rubber (NR), isoprene rubber (IR), butadiene rubber (BR), aromatic vinyl-conjugated diene copolymer rubber, acrylonitrile-butadiene copolymer rubber (NBR), butyl rubber (IIR), halogenated butyl rubber (Br-IIR, Cl-IIR), chloroprene (CR), hydrogenated nitrile rubber (H-NBR), ethylene propylene diene rubber (EPDM), and the like. These may be used individually or a combination of two or more may be used.

Of these, aromatic vinyl-conjugated diene copolymer rubber is preferable because of its good compatibility with the nitrone compound (B) described below and excellent reactivity.

Examples of the aromatic vinyl-conjugated diene copolymer rubber described above include styrene-butadiene copolymer rubber (SBR), styrene-isoprene copolymer rubber, and the like. Of these, styrene-butadiene copolymer rubber (SBR) is preferable from the perspective of wear resistance of the resulting tire.

Nitrone Compound (B)

The nitrone compound (B) described above is not particularly limited as long as the nitrone compound (B) is a nitrone having at least one carboxy group (—COOH) (hereinafter, also referred to as "carboxynitrone" for convenience). For example, a carboxynitrone represented by Formula (b) below is suitable for use. Note that "nitrone" is a generic term for compounds in which an oxygen atom is bonded to a nitrogen atom of a Schiff base.

[Chemical Formula 2]

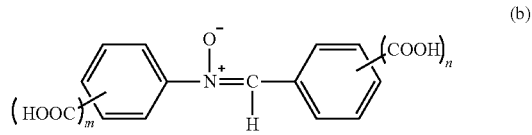

(b)

In Formula (b), m and n each independently represent an integer from 0 to 5, and a sum of m and n is 1 or greater.

The integer represented by m is preferably an integer from 0 to 2, and more preferably an integer 0 or 1, because solubility to a solvent during nitrone compound synthesis is better and thus synthesis easier.

The integer represented by n is preferably an integer from 0 to 2, and more preferably an integer 0 or 1, because solubility to a solvent during nitrone compound synthesis is better and thus synthesis easier.

Furthermore, the sum of m and n (m+n) is preferably from 1 to 4, and more preferably 1 or 2.

The compound is not particularly limited to a carboxynitrone such as that represented by Formula (b) but is preferably a compound selected from the group consisting of N-phenyl-α-(4-carboxyphenyl)nitrone represented by Formula (b1) below, N-phenyl-α-(3-carboxyphenyl)nitrone represented by Formula (b2) below, N-phenyl-α-(2-carboxyphenyl)nitrone represented by Formula (b3) below, N-(4-carboxyphenyl)-α-phenylnitrone represented by Formula (b4) below, N-(3-carboxyphenyl)-α-phenylnitrone represented by Formula (b5) below, and N-(2-carboxyphenyl)-α-phenylnitrone represented by Formula (b6) below.

[Chemical Formula 3]

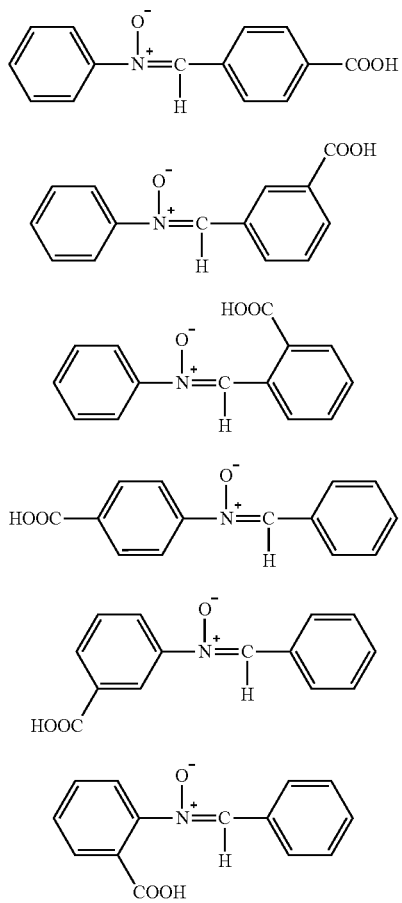

The method of synthesizing the nitrone compound (B) is not particularly limited, and conventionally known methods can be used. For example, nitrones having a nitrone group are obtained by stirring a compound having a hydroxyamino group (—NHOH) and a compound having an aldehyde group (—CHO) at a molar ratio of hydroxyamino group to aldehyde group (—NHOH/—CHO) of from 1.0 to 1.5 in the presence of an organic solvent (for example methanol, ethanol, tetrahydrofuran, and the like) at room temperature for from 1 to 24 hours to allow the both groups to react.

Method of Preparing Modified Diene Polymer

The method for producing the modified diene polymer is not limited to a particular method. Examples of the method include blending the unmodified diene polymer (A) described above and the nitrone compound (B) at a temperature of from 100° C. to 200° C. for from 1 to 30 minutes.

When blended as such, a cycloaddition reaction occurs between the double bond of the conjugated diene contained in the unmodified diene polymer (A) and the nitrone group in the nitrone compound (B), forming a five-membered ring as illustrated in Formula (I) and Formula (II) below. Note that Formula (I) below represents a reaction between a 1,4 bond and a nitrone compound, and Formula (II) below represents a reaction between a 1,2-vinyl bond and a nitrone compound.

[Chemical Formula 4]

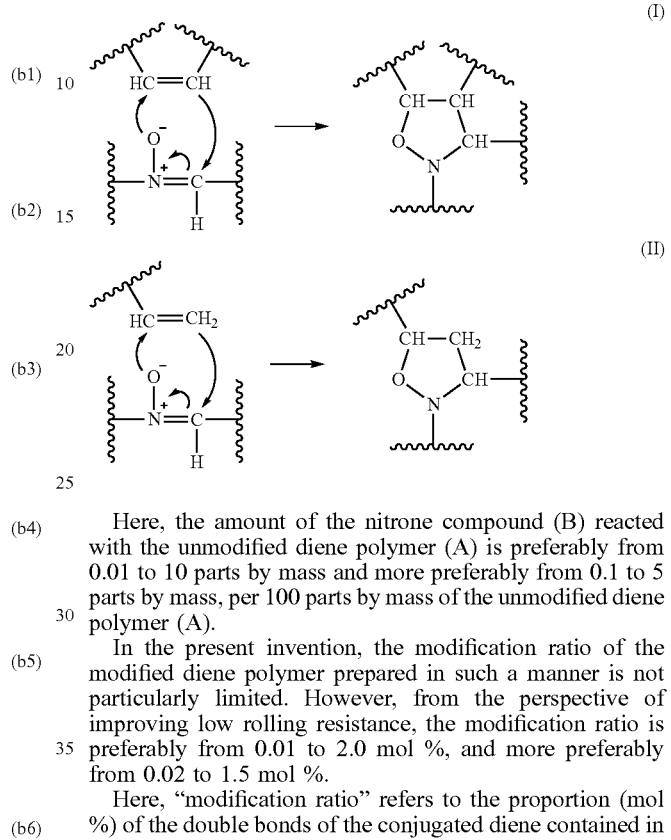

Here, the amount of the nitrone compound (B) reacted with the unmodified diene polymer (A) is preferably from 0.01 to 10 parts by mass and more preferably from 0.1 to 5 parts by mass, per 100 parts by mass of the unmodified diene polymer (A).

In the present invention, the modification ratio of the modified diene polymer prepared in such a manner is not particularly limited. However, from the perspective of improving low rolling resistance, the modification ratio is preferably from 0.01 to 2.0 mol %, and more preferably from 0.02 to 1.5 mol %.

Here, "modification ratio" refers to the proportion (mol %) of the double bonds of the conjugated diene contained in the unmodified diene polymer (A) that are modified with the nitrone compound (B), and specifically, the proportion (mol %) formed in the structure of Formula (I) or Formula (II) above via modification by the nitrone compound (B). The modification ratio, for example, can be found by performing NMR measurement of the unmodified diene polymer (A) and the modified diene polymer (i.e., the polymer before and after modification).

Aromatic Modified Terpene Resin

The aromatic modified terpene resin contained in the rubber composition of the present invention is obtained by the polymerization of a terpene and an aromatic compound.

Specific examples of terpenes include α-pinene, β-pinene, dipentene, limonene, camphene, and the like.

Specific examples of aromatic compounds include styrene, α-methylstyrene, vinyl toluene, phenol, indene, and the like.

Of these, the aromatic modified terpene resin is preferably a styrene modified terpene resin modified by a styrene compound as the aromatic compound.

In the present invention, the aromatic modified terpene resin preferably has a softening point from 60° C. to 180° C., and more preferably from 100° C. to 130° C. Note that the softening point of the aromatic modified terpene resin is measured in accordance with JIS K6220-1 (ring and ball method).

Commercially available products such as YS RESIN TO-125, TO-115, TO-105, and TR-105 manufactured by Yasuhara Chemical Co., Ltd., may be used as the aromatic modified terpene resin.

The content of the aromatic modified terpene resin described above is preferably from 0.10 to 50 parts by mass, and more preferably from 1 to 40 parts by mass, per 100 parts by mass of the diene-based rubber described above.

White Filler

The rubber composition of the present invention preferably contains a white filler from the perspective of improving the wet grip performance of the tire.

Specific examples of the white filler are silica, calcium carbonate, magnesium carbonate, talc, clay, alumina, aluminum hydroxide, titanium oxide, calcium sulfate, and the like. One of these can be used alone, or a combination of two or more can be used.

Of these, silica is preferable.

Specific examples of silica are wet silica (hydrous silicic acid), dry silica (silicic anhydride), calcium silicate, aluminum silicate, and the like. One of these can be used alone, or a combination of two or more can be used.

The content of the white filler described above is not particularly limited, but is preferably from 8 to 130 parts by mass, and more preferably from 25 to 95 parts by mass, per 100 parts by mass of the diene-based rubber described above.

Carbon Black

The rubber composition of the present invention preferably contains carbon black.

The carbon black is not particularly limited and, for example, carbon blacks of various grades, such as SAF-HS, SAF, ISAF-HS, ISAF, ISAF-LS, IISAF-HS, HAF-HS, HAF, HAF-LS, and FEF, can be used.

The content of the carbon black is not particularly limited, but is preferably from 25 to 80 parts by mass, and more preferably from 40 to 60 parts by mass, per 100 parts by mass of the diene-based rubber described above.

Silane Coupling Agent

When the rubber composition of the present invention contains the white filler (especially silica) described above, the rubber composition preferably contains a silane coupling agent because it improves the reinforcing performance of the tire.

When the silane coupling agent is used, a content thereof is preferably from 2 to 16 parts by mass, and more preferably from 4 to 10 parts by mass, per 100 parts by mass of the white filler described above.

Specific examples of the above silane coupling agent include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, dimethoxymethylsilylpropyl benzothiazole tetrasulfide, and the like. One of these examples can be used alone, or a combination of two or more can be used.

Of these examples, to improve the reinforcing properties of the tire, bis(3-triethoxysilylpropyl)tetrasulfide and/or bis(3-triethoxysilylpropyl)disulfide is preferably used. Specific examples thereof include Si69 (bis(3-triethoxysilylpropyl) tetrasulfide, manufactured by Evonik Degussa), Si75 (bis(3-triethoxysilylpropyl)disulfide, manufactured by Evonik Degussa), and the like.

Other Additives

The rubber composition of the present invention contains the diene rubber (contains the modified diene polymer), the aromatic modified terpene resin, the white filler, the carbon black, and the silane coupling agent described above. Additionally, the rubber composition can contain various other additives typically used in a rubber composition for a tire including a filler such as calcium carbonate; a vulcanizing agent such as sulfur; a sulfenamide-based, guanidine-based, thiazole-based, thiourea-based, or thiuram-based vulcanization accelerator; a vulcanization accelerator aid such as zinc oxide and stearic acid; wax; aroma oil, an anti-aging agent; a plasticizer, and the like.

The compounded amount of these additives may be any conventional amount, as long as the object of the present invention is not impaired. For example, the compounded amounts per 100 parts by mass of the diene-based rubber may be:

sulfur: from 0.5 to 5 parts by mass,
vulcanization accelerator: from 0.1 to 5 parts by mass,
vulcanization accelerator aid: from 0.1 to 10 parts by mass,
anti-aging agent: from 0.5 to 5 parts by mass,
wax: from 1 to 10 parts by mass, and
aroma oil: from 5 to 30 parts by mass.

Method for Producing Rubber Composition

The method for producing the composition of the present invention is not particularly limited, and specific examples thereof include a method whereby each of the above-mentioned components is kneaded using a publicly known method and device (e.g. Banbury mixer, kneader, roll, and the like). When the composition of the present invention contains sulfur or a vulcanization accelerator, the components other than the sulfur and the vulcanization accelerator are preferably blended first (for example, blended at a temperature of from 60° C. to 160° C.), then cooled, before blending the sulfur and the vulcanization accelerator.

In addition, the composition of the present invention can be vulcanized or crosslinked under conventional, publicly known vulcanizing or crosslinking conditions.

Pneumatic Tire

The pneumatic tire of the present invention is a pneumatic tire that comprises the composition of the present invention. Moreover, the pneumatic tire of the present invention is preferably a pneumatic tire that comprises the rubber composition of the present invention in the tire tread.

FIG. 1 is a partial cross-sectional schematic view of a tire that represents one embodiment of the pneumatic tire of the present invention, but the pneumatic tire of the present invention is not limited to the embodiment illustrated in FIG. 1.

In FIG. 1, reference sign 1 denotes a bead portion, reference sign 2 denotes a sidewall portion, and reference sign 3 denotes a tire tread portion.

In addition, a carcass layer 4, in which fiber cords are embedded, is mounted between a left-right pair of the bead portions 1, and ends of the carcass layer 4 are turned up around bead cores 5 and bead fillers 6 from an inner side to an outer side of the tire.

In the tire tread portion 3, a belt layer 7 is provided along the entire circumference of the tire on the outer side of the carcass layer 4.

Additionally, rim cushions 8 are provided in parts of the bead portions 1 that are in contact with a rim.

The pneumatic tire of the present invention can be produced, for example, in accordance with a conventionally known method. In addition to ordinary air or air with an adjusted oxygen partial pressure, inert gases such as nitrogen, argon, and helium can be used as the gas with which the tire is filled.

EXAMPLES

The present invention is described below in detail using examples, but is in no way limited to these examples.

Synthesis of Nitrone Compound (Carboxynitrone)

In a 2 L pear-shaped flask, methanol heated to 40° C. (900 mL) was placed, and then terephthalaldehydic acid represented by Formula (2) below (30.0 g) was added and dissolved. In this solution, a solution in which phenylhydroxylamine represented by Formula (1) below (21.8 g) was dissolved in methanol (100 mL) was added and stirred at room temperature for 19 hours. After the completion of stirring, the nitrone compound represented by Formula (3) below (41.7 g) was obtained by recrystallization from methanol. The yield was 86%.

[Chemical Formula 5]

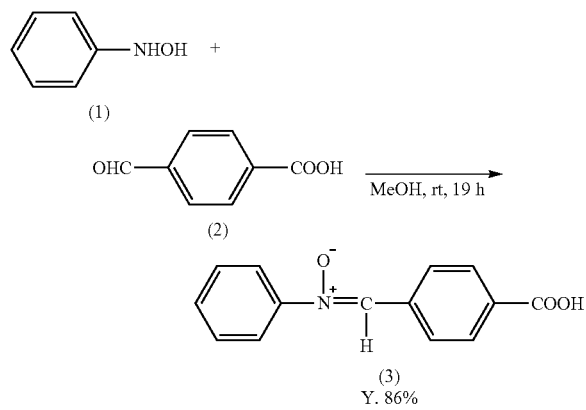

Synthesis of Nitrone Compound (Pyridylnitrone)

In a 2 L pear-shaped flask, methanol heated to 40° C. (900 mL) was placed, and then pyridine-2-carbaldehyde represented by Formula (5) below (21.4 g) was added and dissolved. In this solution, a solution in which phenylhydroxylamine represented by Formula (4) below (21.8 g) was dissolved in methanol (100 mL) was added and stirred at room temperature for 19 hours. After the completion of stirring, pyridylnitrone (39.0 g) represented by Formula (6) below was obtained by recrystallization from methanol. The yield was 90%.

[Chemical Formula 6]

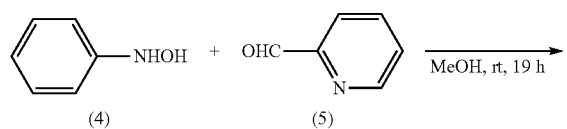

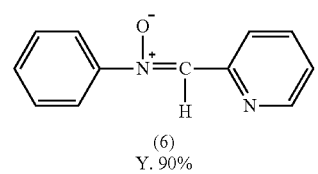

(6)
Y. 90%

Preparation of Modified Diene Polymer (Modified SBR)

Unmodified SBR (NIPOL 1739, manufactured by Zeon Corporation) was charged in a banbury mixer with a temperature of 160° C. and masticated for 2 minutes. Thereafter, the synthesized carboxynitrone or pyridylnitrone was blended and mixed at the proportion (parts by mass) shown in Table 1 below for 5 minutes to prepare modified SBR 1 to 5. Note that "molar ratio (nitrone/SBR)" in Table 1 below refers to the molar ratio between the nitrone compound and the double bonds contained in the backbone of the butadiene of the unmodified SBR.

The obtained modified SBR 1 to 5 were measured via NMR and the modification ratio of each was found. Specifically, in the cases in which carboxynitrone was used, the polymers before and after modification were measured for the peak area (derived from two protons adjacent to the carboxy group) at around 8.08 ppm via $^1$H-NMR (CDCl$_3$, 400 MHz, TMS) using CDCl$_3$ as a solvent to find the modification ratio. Specifically, in the cases in which pyridylnitrone was used, the modification ratio was found in a similar manner except that the peak area derived from the pyridyl group was measured. Note that the samples used in the $^1$H-NMR measurement of the modified polymer (modified butadiene rubber) were dissolved in toluene, purified by methanol precipitation 2 times, and then dried under reduced pressure. The results are shown in Table 1 below.

TABLE 1

| | Modified diene polymer (modified SBR) | | | | |
|---|---|---|---|---|---|
| | 1 | 2 | 3 | 4 | 5 |
| SBR (unmodified) | 137.50 | 137.50 | 137.50 | 137.50 | 137.50 |
| Carboxynitrone | 0.50 | 1.00 | 3.00 | 7.00 | — |
| Pyridylnitrone | — | — | — | — | 1.00 |
| Molar ratio (Nitrone/SBR) | 0.19 | 0.38 | 1.13 | 2.61 | 0.47 |
| Modification ratio (mol %) | 0.19 | 0.38 | 1.13 | 2.50 | 0.46 |

Comparative Examples 1 to 11 and Working Examples 1 to 9

The components shown in Table 2 below were blended in the proportions (parts by mass) shown in Table 2.

Specifically, the components shown in Table 2 below except from sulfur and the vulcanization accelerator were first mixed in a Banbury mixer with a temperature of 80° C. for 5 minutes. Thereafter, a roll was used to mix in the sulfur and the vulcanization accelerator to obtain a rubber composition.

Manufacture of Vulcanized Rubber Sheet for Evaluation

A vulcanized rubber sheet was prepared by press-vulcanizing each of the prepared (unvulcanized) rubber compositions for 20 minutes at 160° C. in a mold (15 cm×15 cm×0.2 cm).

Wet Grip Performance: tan δ (0° C.)

The loss tangent at a temperature of 0° C., tan δ (0° C.), was measured for each vulcanized rubber sheet manufactured as described above using a viscoelastic spectrometer (manufactured by Toyo Seiki Seisaku-sho, Ltd.) under the following conditions: 10% initial distortion, ±2% amplitude, and 20 Hz frequency.

The results are shown in Table 2. Note that the results are displayed as percentages against the result of Comparative Example 1, taken as 100%, in which the modified SBR and the aromatic modified terpene resin were not used. A higher value of tan δ (0° C.) indicates superior wet grip performance.

Low Rolling Resistance: tan δ (60° C.)

The loss tangent at a temperature of 60° C., tan δ (60° C.), was measured for each vulcanized rubber sheet manufactured as described above using a viscoelastic spectrometer (manufactured by Toyo Seiki Seisaku-sho, Ltd.) under the following conditions: 10% initial distortion, ±2% amplitude, and 20 Hz frequency.

The results are shown in Table 2. Note that the results are displayed as percentages against the result of Comparative Example 1, taken as 100%, in which the modified SBR and the aromatic modified terpene resin were not used. A lower value of tan δ (60° C.) indicates superior low rolling resistance.

TABLE 2

| | Comparative Examples | | | | | | | | | | |
|---|---|---|---|---|---|---|---|---|---|---|---|
| | 1 | 2 | 3 | 4 | 5 | 6 | 7 | 8 | 9 | 10 | 11 |
| SBR | 137.50 | 137.50 | | | | | | | 137.50 | 137.50 | 137.50 |
| Modified SBR 1 | | | 138.00 | | | | | | | | |
| Modified SBR 2 | | | | 138.50 | | | | | | | |
| Modified SBR 3 | | | | | 140.50 | | | | | | |
| Modified SBR 4 | | | | | | 144.50 | | | | | |
| Modified SBR 5 | | | | | | | 138.50 | 138.50 | | | |
| Silica | 70.00 | 70.00 | 70.00 | 70.00 | 70.00 | 70.00 | 70.00 | 70.00 | 70.00 | 70.00 | 70.00 |
| Carbon black | 5.00 | 5.00 | 5.00 | 5.00 | 5.00 | 5.00 | 5.00 | 5.00 | 5.00 | 5.00 | 5.00 |
| Zinc oxide | 3.00 | 3.00 | 3.00 | 3.00 | 3.00 | 3.00 | 3.00 | 3.00 | 3.00 | 3.00 | 3.00 |
| Stearic acid | 2.00 | 2.00 | 2.00 | 2.00 | 2.00 | 2.00 | 2.00 | 2.00 | 2.00 | 2.00 | 2.00 |
| Anti-aging agent | 1.50 | 1.50 | 1.50 | 1.50 | 1.50 | 1.50 | 1.50 | 1.50 | 1.50 | 1.50 | 1.50 |
| Aromatic modified terpene resin | | 20.00 | | | | | | 20.00 | 5.00 | 10.00 | 40.00 |
| Silane coupling agent | 5.60 | 5.60 | 5.60 | 5.60 | 5.60 | 5.60 | 5.60 | 5.60 | 5.60 | 5.60 | 5.60 |
| Sulfur | 1.50 | 1.50 | 1.50 | 1.50 | 1.50 | 1.50 | 1.50 | 1.50 | 1.50 | 1.50 | 1.50 |
| Vulcanization accelerator (CZ) | 2.00 | 2.00 | 2.00 | 2.00 | 2.00 | 2.00 | 2.00 | 2.00 | 2.00 | 2.00 | 2.00 |
| Vulcanization accelerator (DPG) | 1.50 | 1.50 | 1.50 | 1.50 | 1.50 | 1.50 | 1.50 | 1.50 | 1.50 | 1.50 | 1.50 |
| Wet grip performance tan δ (0° C.) | 100% | 172% | 101% | 103% | 107% | 108% | 106% | 189% | 112% | 129% | 247% |
| Low rolling resistance tan δ (60° C.) | 100% | 117% | 85% | 79% | 67% | 60% | 94% | 105% | 103% | 105% | 130% |

| | Working Examples | | | | | | | | |
|---|---|---|---|---|---|---|---|---|---|
| | 1 | 2 | 3 | 4 | 5 | 6 | 7 | 8 | 9 |
| SBR | | | | | 116.87 | 68.75 | | | |
| Modified SBR 1 | 138.00 | | | | | | | | |
| Modified SBR 2 | | 138.50 | | | 20.78 | 69.25 | 138.50 | 138.50 | 138.50 |
| Modified SBR 3 | | | 140.50 | | | | | | |
| Modified SBR 4 | | | | 144.50 | | | | | |
| Modified SBR 5 | | | | | | | | | |
| Silica | 70.00 | 70.00 | 70.00 | 70.00 | 70.00 | 70.00 | 70.00 | 70.00 | 70.00 |
| Carbon black | 5.00 | 5.00 | 5.00 | 5.00 | 5.00 | 5.00 | 5.00 | 5.00 | 5.00 |
| Zinc oxide | 3.00 | 3.00 | 3.00 | 3.00 | 3.00 | 3.00 | 3.00 | 3.00 | 3.00 |
| Stearic acid | 2.00 | 2.00 | 2.00 | 2.00 | 2.00 | 2.00 | 2.00 | 2.00 | 2.00 |
| Anti-aging agent | 1.50 | 1.50 | 1.50 | 1.50 | 1.50 | 1.50 | 1.50 | 1.50 | 1.50 |
| Aromatic modified terpene resin | 20.00 | 20.00 | 20.00 | 20.00 | 20.00 | 20.00 | 5.00 | 10.00 | 40.00 |
| Silane coupling agent | 5.60 | 5.60 | 5.60 | 5.60 | 5.60 | 5.60 | 5.60 | 5.60 | 5.60 |
| Sulfur | 1.50 | 1.50 | 1.50 | 1.50 | 1.50 | 1.50 | 1.50 | 1.50 | 1.50 |
| Vulcanization accelerator (CZ) | 2.00 | 2.00 | 2.00 | 2.00 | 2.00 | 2.00 | 2.00 | 2.00 | 2.00 |

TABLE 2-continued

| | | | | | | | | | |
|---|---|---|---|---|---|---|---|---|---|
| Vulcanization accelerator (DPG) | 1.50 | 1.50 | 1.50 | 1.50 | 1.50 | 1.50 | 1.50 | 1.50 | 1.50 |
| Wet grip performance tan δ (0° C.) | 178% | 186% | 193% | 192% | 175% | 186% | 130% | 134% | 258% |
| Low rolling resistance tan δ (60° C.) | 93% | 85% | 80% | 65% | 98% | 95% | 80% | 80% | 92% |

The details of each component shown in Table 2 above are as follows.
- SBR: Nipol 1739 (amount of oil extension per 100 parts by mass of the rubber component: 37.5 parts by mass, styrene content: 40 mass %, manufactured by Zeon Corporation)
- Modified SBR 1 to 5: modified SBR described in Table 1 above
- Silica: ZEOSIL 165GR (manufactured by Rhodia Silica Korea Co., Ltd.)
- Carbon black: Show Black N339 (manufactured by Cabot Japan K.K.)
- Zinc oxide: Zinc White No. 3 (Seido Chemical Industry Co., Ltd.)
- Stearic acid: Stearic acid YR (manufactured by NOF Corporation)
- Anti-aging agent: SANTOFLEX 6PPD (manufactured by Soltia Europe)
- Aromatic modified terpene resin: YS RESIN TO-125 (manufactured by Yasuhara Chemical Co., Ltd.)
- Silane coupling agent: Si69 (manufactured by Evonik Degussa)
- Sulfur: oil treatment sulfur (manufactured by Karuizawa Refinery Ltd.)
- Vulcanization accelerator (CZ): Nocceler CZ-G (manufactured by Ouchi Shinko Chemical Industrial Co., Ltd.)
- Vulcanization accelerator (DPG): Soxinol D-G (manufactured by Sumitomo Chemical Co., Ltd.)

As seen from the results shown in Table 2 above, rubber compositions not containing at least one of the modified diene polymer or the aromatic modified terpene resin have improved low rolling resistance but similar (approximately 110% or less) wet grip performance to Comparative Example 1 (Comparative Examples 3 to 7) or have improved wet grip performance but degraded low rolling resistance (Comparative Examples 2 and 9 to 11).

In addition, rubber compositions that contain both the modified diene polymer and the aromatic modified terpene resin but the modified diene polymer is modified by the pyridylnitrone have good wet grip performance but degraded low rolling resistance (Comparative Example 8).

On the other hand, rubber compositions that contain the modified diene polymer modified by the carboxynitrone and the aromatic modified terpene resin have both good wet grip performance and low rolling resistance (Working Examples 1 to 9).

In particular, as is clear from a comparison of Working Examples 1 to 4, rubber compositions that contain the modified diene polymer modified at a high modification ratio by the carboxynitrone have better wet grip performance and low rolling resistance.

From a comparison of Working Examples 2, 5, and 6, it is clear that rubber compositions in which the content of the modified diene polymer in the diene-based rubber is 30 mass % or greater have better low rolling resistance.

From a comparison of Working Examples 7 to 9, it is clear that rubber compositions in which the content of the aromatic modified terpene resin is large have better wet grip performance.

REFERENCE SIGNS LIST

1 Bead portion
2 Sidewall portion
3 Tire tread portion
4 Carcass layer
5 Bead core
6 Bead filler
7 Belt layer
8 Rim cushion

The invention claimed is:

1. A rubber composition comprising:
a diene-based rubber containing 10 mass % or greater of a modified diene polymer; and
an aromatic modified terpene resin; wherein
the modified diene polymer is a modified polymer obtained by modifying an unmodified aromatic vinyl-conjugated diene copolymer (A) with a nitrone compound (B) having a carboxy group;
a content of the aromatic modified terpene resin is from 0.1 to 50 parts by mass per 100 parts by mass of the diene-based rubber; and
the nitrone compound (B) is a compound selected from the group consisting of N-phenyl-α-(4-carboxyphenyl)nitrone, N-phenyl-α-(3-carboxyphenyl)nitrone, N-phenyl-α-(2-carboxyphenyl)nitrone, N-(4-carboxyphenyl)-α-phenylnitrone, N-(3-carboxyphenyl)-α-phenylnitrone, and N-(2-carboxyphenyl)-α-phenylnitrone.

2. The rubber composition according to claim 1, wherein a modification ratio of the modified diene polymer is from 0.01 to 2.0 mol %.

3. The rubber composition according to claim 1 further comprising a white filler.

4. A pneumatic tire comprising the rubber composition described in claim 1.

5. The rubber composition according to claim 2 further comprising a white filler.

6. A pneumatic tire comprising the rubber composition described in claim 2.

7. A pneumatic tire comprising the rubber composition described in claim 3.

* * * * *